United States Patent
Takasuka et al.

[11] Patent Number: 5,978,722
[45] Date of Patent: Nov. 2, 1999

[54] APPARATUS FOR DETERMINING COLLISION FOR AIR BAG

[75] Inventors: Hirofumi Takasuka, Akashi; Hiroyuki Konishi, Himeji; Jun Fujiwara, Kakogawa; Masaru Yokochi, Nagoya; Yoshikazu Ohno, Okazaki, all of Japan

[73] Assignees: Fujitsu Ten Limited, Kobe; Toyota Jidosha Kabushiki Kaisha, Toyota, both of Japan

[21] Appl. No.: 08/769,443

[22] Filed: Dec. 19, 1996

[30] Foreign Application Priority Data

Dec. 25, 1995 [JP] Japan ................................. 7-337029

[51] Int. Cl.⁶ ................................................. B60R 21/16
[52] U.S. Cl. ............................ 701/45; 701/46; 180/282
[58] Field of Search ........................... 701/45, 46, 47; 180/282; 280/735; 340/436

[56] References Cited

U.S. PATENT DOCUMENTS

| | | | |
|---|---|---|---|
| 5,068,793 | 11/1991 | Condne et al. | 701/46 |
| 5,285,187 | 2/1994 | Hirao et al. | 340/436 |
| 5,285,188 | 2/1994 | Yoshida | 340/436 |
| 5,309,138 | 5/1994 | Tohbaru | 180/282 |
| 5,375,468 | 12/1994 | Ohta et al. | 73/514.29 |
| 5,394,326 | 2/1995 | Liu | 701/46 |
| 5,402,343 | 3/1995 | Shibata et al. | 701/46 |
| 5,431,441 | 7/1995 | Okano | 280/735 |
| 5,594,647 | 1/1997 | Yasuda et al. | 701/45 |

FOREIGN PATENT DOCUMENTS

A-6-55996  3/1994  Japan .

*Primary Examiner*—Tan Nguyen
*Attorney, Agent, or Firm*—Oliff & Berridge, PLC

[57] ABSTRACT

An apparatus detects a collision according to a signal from an acceleration sensor 1, to deploy an air bag of a car. The apparatus prevents an erroneous deployment of the air bag when the car is driving along a rough road. The apparatus employs two deceleration thresholds for a signal from the acceleration sensor 1. The apparatus has a signal integrator 3 that integrates an area of the signal defined by the thresholds as well as an acceleration area of the same signal. The apparatus has a determination unit 4 that determines a collision if an integral provided by the signal integrator 3 is above a value corresponding to an OFF collision that requires no deployment of the air bag.

12 Claims, 10 Drawing Sheets

Fig. 1

Fig.2a COLLISION WAVEFORM $V_G(t)$

Fig.2b $V_{Na}(t)$

Fig.2c ROUGH-ROAD WAVEFORM $V_G(t)$

APPARATUS FOR DETERMINING COLLISION FOR AIR BAG

BACKGROUND OF THE INVENTION

1. Field of the Invention

The present invention relates to an apparatus for determining a collision for an air bag of a car, and particularly, to one capable of preventing an erroneous deployment of the air bag when the car is driving along a rough road.

2. Description of the Related Art

An apparatus for determining a collision for an air bag of a car has an acceleration sensor to detect deceleration at a collision. The apparatus processes a signal from the acceleration sensor, and if the air bag must be deployed, provides an ignition signal at proper timing. The acceleration sensor detects collision energy as deceleration. The apparatus integrates the deceleration signal while the signal is being above a threshold, and when the integral reaches a given value, generates an ignition signal. When the car is driving at a speed of below 13 km/h, collision energy is too small to deploy the air bag. Accordingly, collision deceleration at such a low speed is used as a threshold to determine whether or not the air bag must be deployed. A low-speed collision that requires no deployment of the air bag is an OFF collision, and a collision that needs the air bag is an ON collision.

When the car is driving along a rough road, the acceleration sensor may provide a deceleration signal. The signal sometimes exceeds the threshold, to indicate the ON collision. To prevent an erroneous deployment of the air bag on the rough road, the threshold must be high. This, however, delays a deployment of the air bag at the ON collision on a normal road.

SUMMARY OF THE INVENTION

An object of the present invention is to provide an apparatus for determining a collision for an air bag of a car, capable of deploying the air bag at a collision both on rough and normal roads without delay.

In order to accomplish the object, the present invention provides an apparatus for determining a collision for an air bag of a car, having an acceleration sensor, an integration unit, and a determination unit. The integration unit integrates a signal from the acceleration sensor in an area below a first threshold, in an area above a second threshold that is lower than the first threshold, in an area below the first threshold and above the second threshold, or in an area below the first threshold and above the second threshold and in an acceleration area. The determination unit determines that a collision to deploy the air bag has occurred if the integral is above a given value. When the car is driving along a rough road, the acceleration sensor provides a high-frequency signal, and therefore, an integral from the integration unit becomes smaller than that from the OFF collision. Accordingly, the determination unit may employ an OFF-collision integral as a threshold to avoid an erroneous deployment of the air bag. Since it is not necessary to increase the threshold higher than the OFF collision integral, there will be no delay in deploying the air bag at the ON collision.

The output of the acceleration sensor is integrated at given intervals, to remove unnecessary high-frequency components therefrom.

If the signal from the acceleration sensor indicates deceleration and is below the second threshold, the present invention attenuates an integral of the output of the acceleration sensor according to a given time constant. This may zero the integral as soon as the rough-road driving ends and prevents an erroneous collision determination even if the rough-road driving resumes.

The second threshold is set so that it may not be reached while the car is driving normally. An integral provided by the integration unit is zero if the car is driving normally, to prevent the determination unit from erroneously providing a collision signal.

The first threshold is set so that the determination unit may determine whether or not the air bag must be deployed within a specified time. The first threshold restricts a signal from the acceleration sensor.

If an integral of the area below the first threshold and above the second threshold of the output of the acceleration sensor is smaller than an integral of an acceleration area of the same output, the sum of the integrals is zeroed to prevent a delay in determining the ON collision.

The apparatus may have a second determination unit that determines a collision directly according to the output of the acceleration sensor, and an output unit that provides a collision signal only when both the determination units determine a collision. This arrangement of the present invention is easily applicable to an existing apparatus for determining a collision.

DESCRIPTION OF THE PREFERRED EMBODIMENTS

Figure 1:
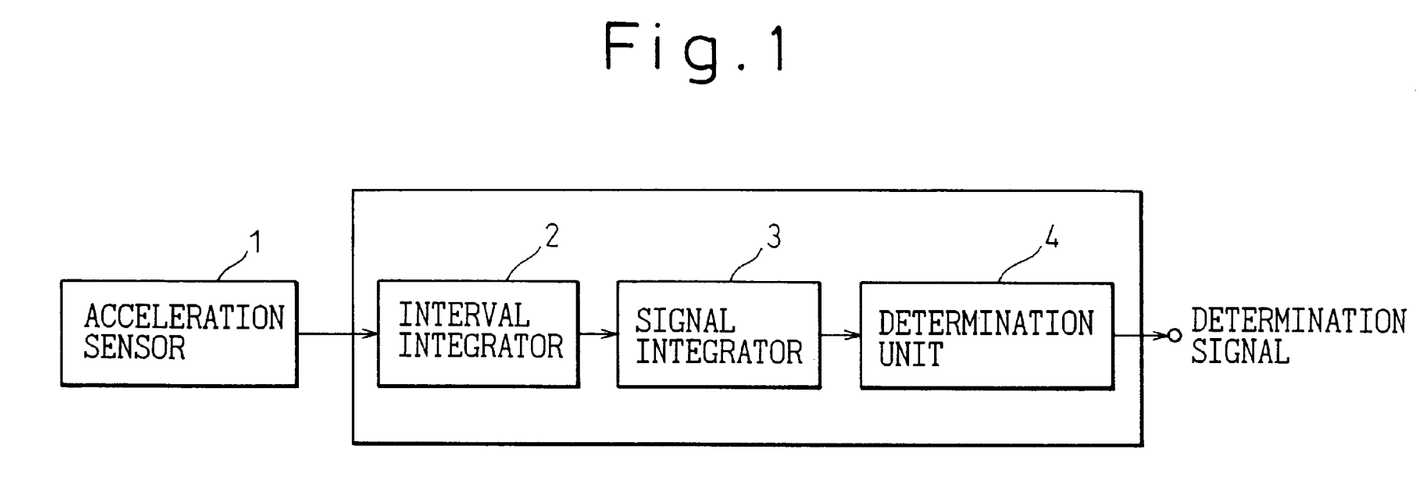
FIG. 1 shows an apparatus for determining a collision for an air bag according to the present invention.

FIG. 1 shows an apparatus for determining a collision for an air bag of a car according to an embodiment of the present invention. The apparatus has an interval integrator 2 for integrating a signal from an acceleration sensor 1 at given intervals, a signal integrator 3 for integrating the output of the interval integrator 2, and a determination unit 4 for providing a signal indicating a collision if the output of the signal integrator 3 is above a given value.

Figure 2A:
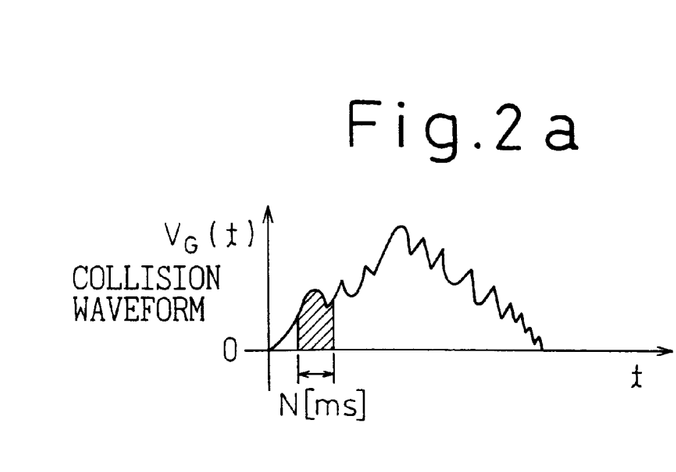
FIG. 2(a) shows a collision waveform from an acceleration sensor.
Figure 2B:
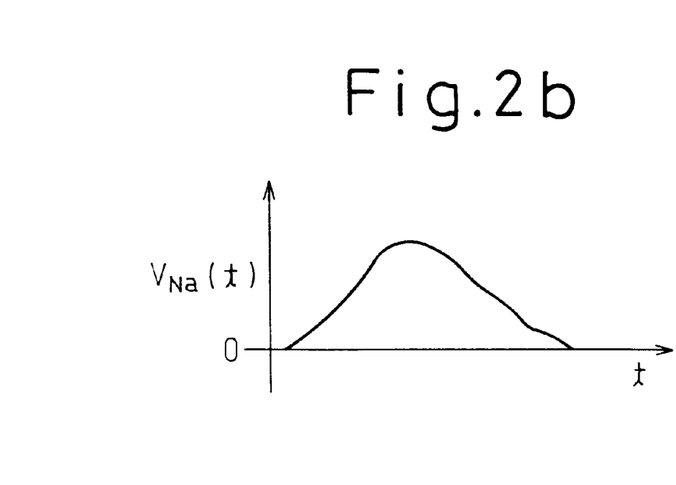
FIG. 2(b) shows an integral VNa(t) of the waveform of FIG. 2(a)
Figure 2C:
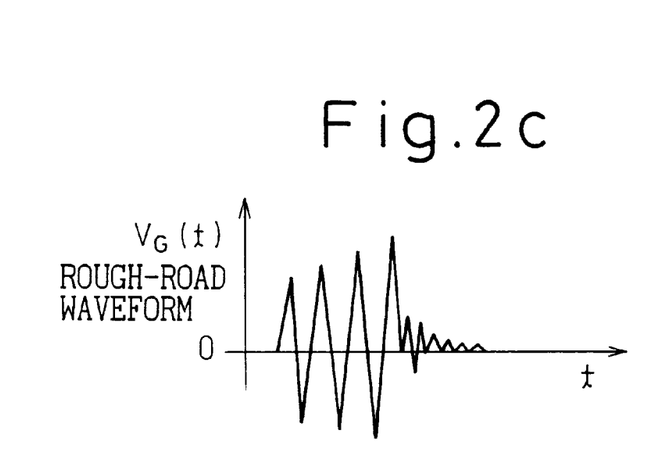
FIG. 2(c) shows a rough-road waveform from the acceleration sensor.

FIG. 2(a) shows a collision waveform from the acceleration sensor 1, and FIG. 2(c) shows a rough-road waveform from the same sensor. Compared with the collision waveform, the rough-road waveform has a shorter period and higher frequency.

Figure 2D:
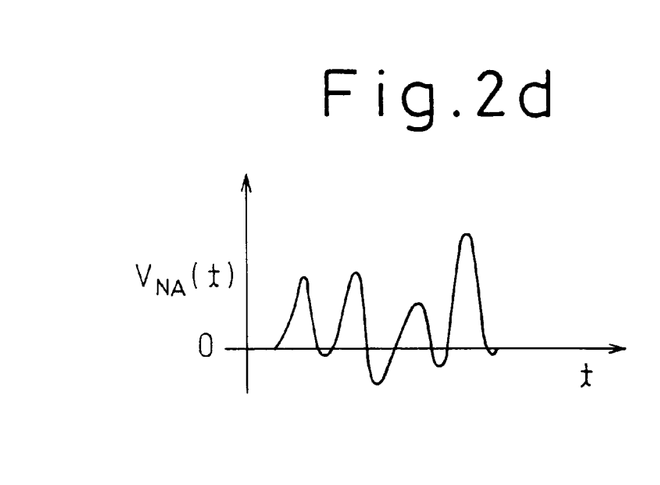
FIG. 2(d) shows an integral VNA(t) of the waveform of FIG. 2(c)

The interval integrator 2 integrates an output signal VG(t) of the acceleration sensor 1 as follows to remove unnecessary high-frequency components:

$$VN(t) = \int_{t-N}^{t} VG(t) dt$$

where N is an integration interval, which is, for example, 10 ms when a sampling period is 0.5 ms. FIG. 2(b) shows an integral VNa(t) of the collision waveform of FIG. 2(a), and FIG. 2(d) shows an integral VNA(t) of the rough-road waveform of FIG. 2(c). When the integral is positive, it indicates deceleration, and when it is negative, acceleration.

Compared with the collision integral VNa(t), the rough-road integral VNA(t) is higher in frequency and includes acceleration components (negative components) that are not shown in the collision integral VNa(t).

FIGS. 3 and 4 show areas (hatched parts) of the integrals VNa(t) and VNA(t) of FIGS. 2(b) and 2(d) to be integrated by the signal integrator 3. The signal integrator 3 regularly integrates them as follows while the car is operating:

$$VS(t) \int_{0}^{t} VN(t) dt$$

Figure 3A:
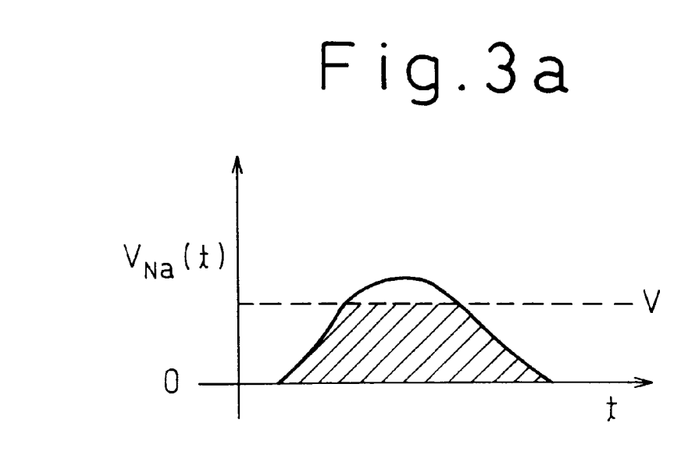
FIG. 3(a) shows the integral VNa(t) to be integrated in an area below a first threshold V.
Figure 3B:
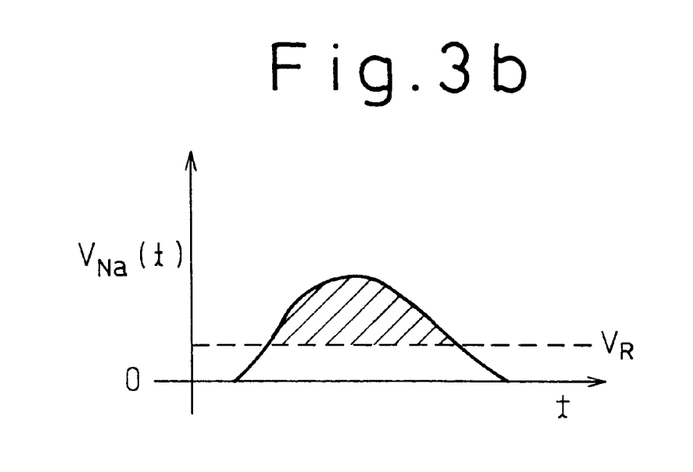
FIG. 3(b) shows the integral VNa(t) to be integrated in an area above a second threshold VR.
Figure 3C:
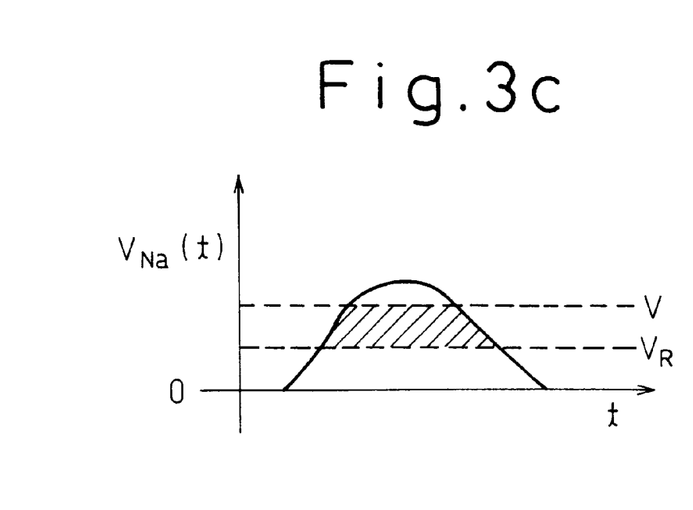
FIG. 3(c) shows the integral VNa(t) to be integrated in an area between VR and V.
Figure 3D:
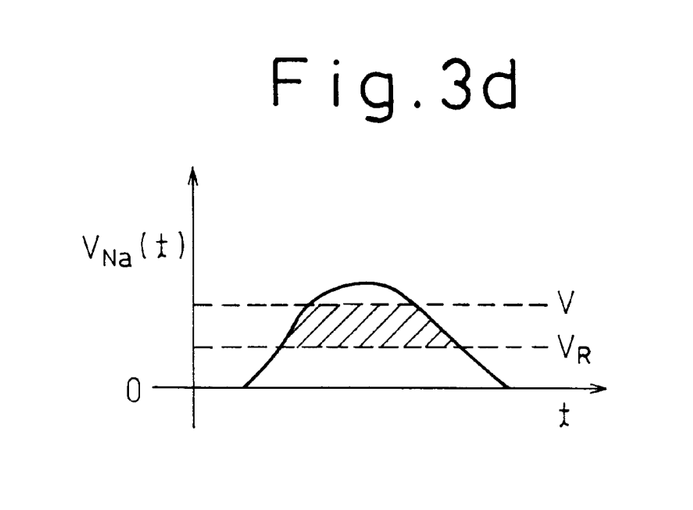
FIG. 3(d) shows the integral VNa(t) to be integrated in the area between VR and V and in a negative area.
Figure 4A:
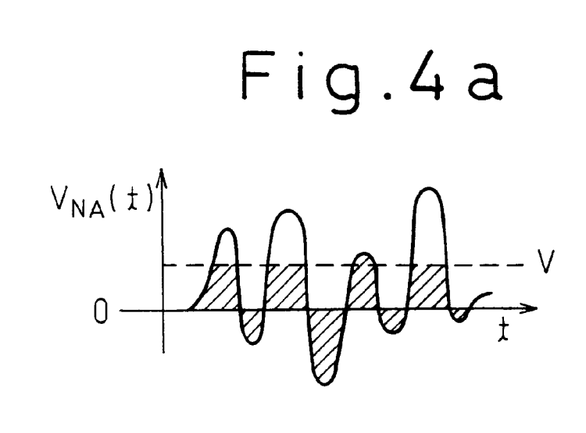
FIG. 4(a) shows the integral VNA(t) to be integrated in an area below the first threshold V.
Figure 4B:
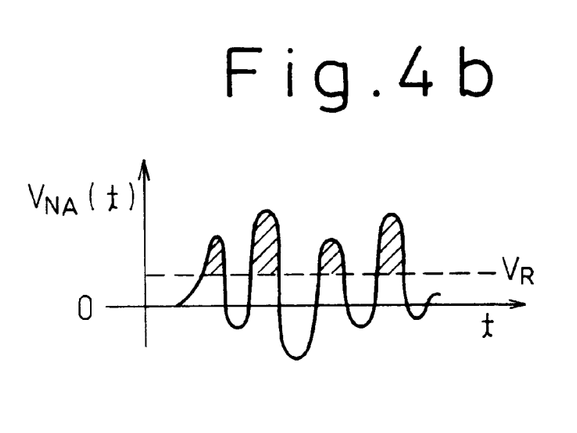
FIG. 4(b) shows the integral VNA(t) to be integrated in an area above the second threshold VR.
Figure 4C:
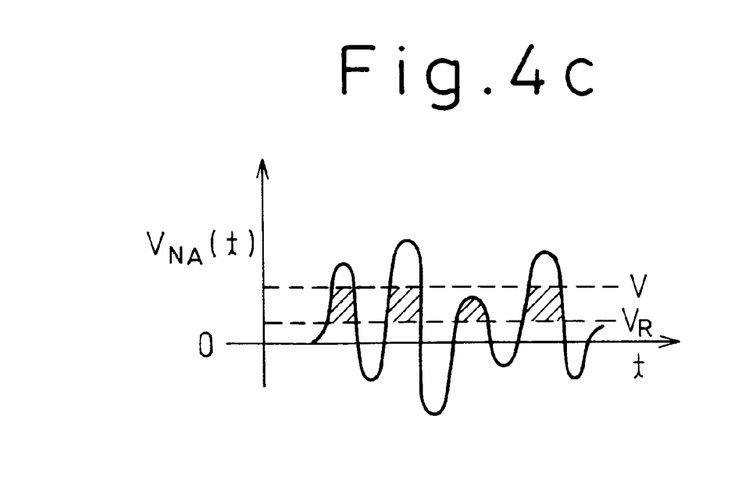
FIG. 4(c) shows the integral VNA(t) to be integrated in an area between VR and V.
Figure 4D:
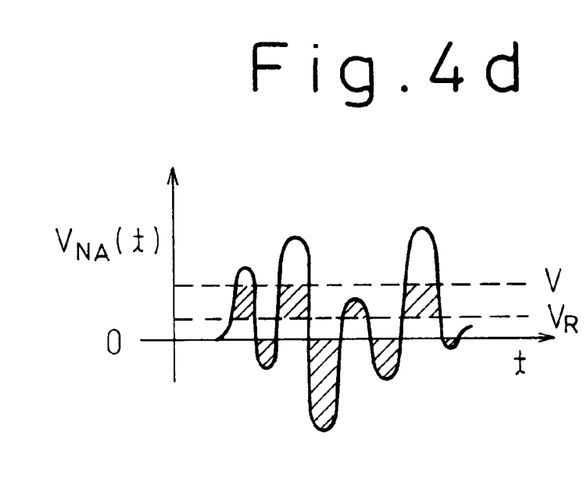
FIG. 4(d) shows the integral VNA(t) to be integrated in the area between VR and V and in a negative area.
Figure 5A:
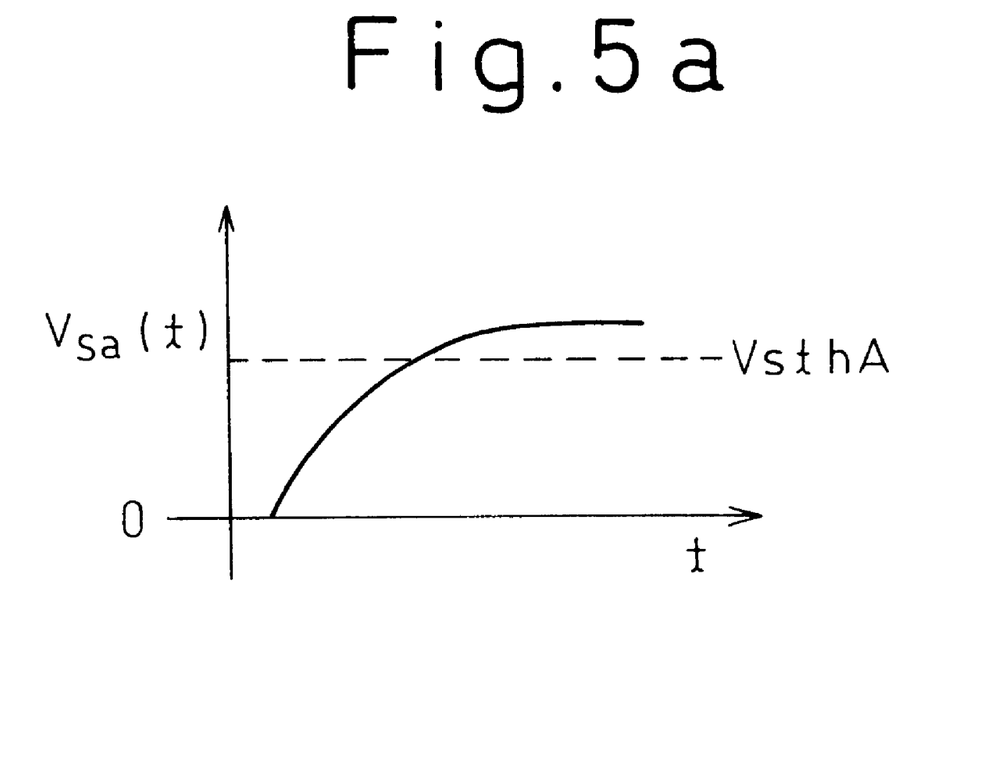
FIG. 5(a) shows an integral VSa(t) based on FIG. 3(a)
Figure 5B:
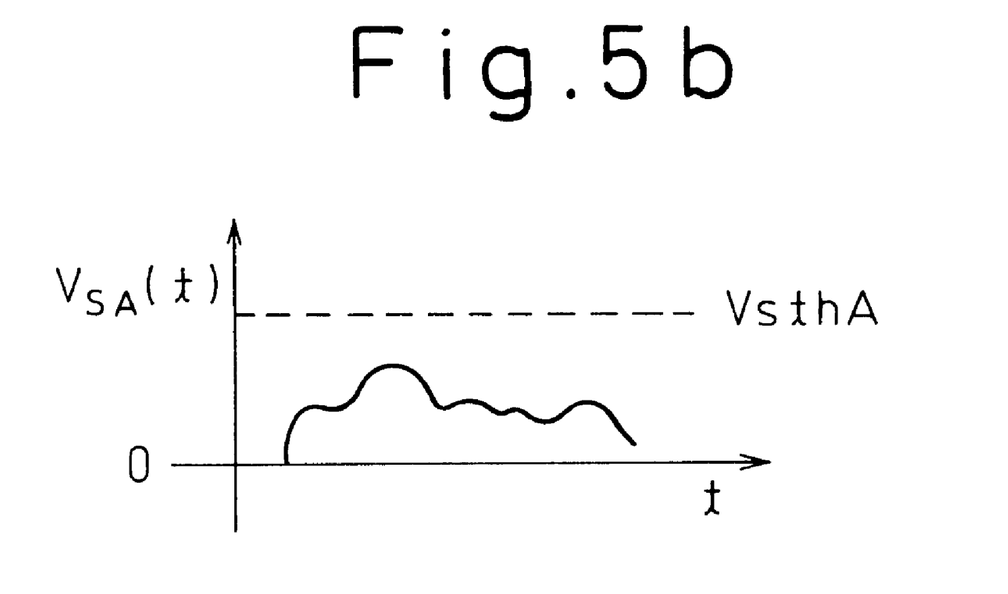
FIG. 5(b) shows an integral VSA(t) based on FIG. 4(a)

FIGS. 3(a) and 4(a) show areas each below a first threshold (guard threshold) V of the integrals VNa(t) and VNA(t) to be integrated, FIGS. 3(b) and 4(b) show areas each above a second threshold VR of the same integrals to be integrated, FIGS. 3(c) and 4(c) show areas each between VR and V of the same integrals to be integrated, and FIGS. 3(d) and 4(d) show areas each between VR and V or below 0 of the same integrals to be integrated.

When a negative part, i.e., an acceleration part of the integral VN(t) is integrated, a resultant integral is negative.

FIGS. 5(a), 6(a), 7(a), and 8(a) show integrals VSa(t), VSb(t), VSc(t), and VSd(t) of the areas shown in FIGS. 3(a), 3(b), 3(c), and 3(d), respectively. FIGS. 5(b), 6(b), 7(b), and 8(b) show integrals VSA(t), VSB(t), VSC(t), and VSD(t) of the areas shown in FIGS. 4(a), 4(b), 4(c), and 4(d), respectively.

The rough-road integral VNA(t) involves the negative (acceleration) parts. Accordingly, the integrals of FIGS. 4(a) and 4(d) are integrated into the integrals VSA(t) and VSD(t) of FIGS. 5(b) and 8(b) that are smaller than the collision integrals VSa(t) and VSd(t) of FIGS. 5(a) and 8(a).

The determination unit 4 compares the output VS(t) of the signal integrator 3 with a threshold VSth, and if VS(t) is larger than VSth, determines that a collision has occurred. Since VSA(t)<VSa(t), a threshold VSthA is set as VSA(t) <VSthA<VSa(t), and a threshold VSthD is set as VSD(t) <VSthD<VSd(t). This prevents an erroneous collision determination when the car is driving along a rough road.

Figure 6A:
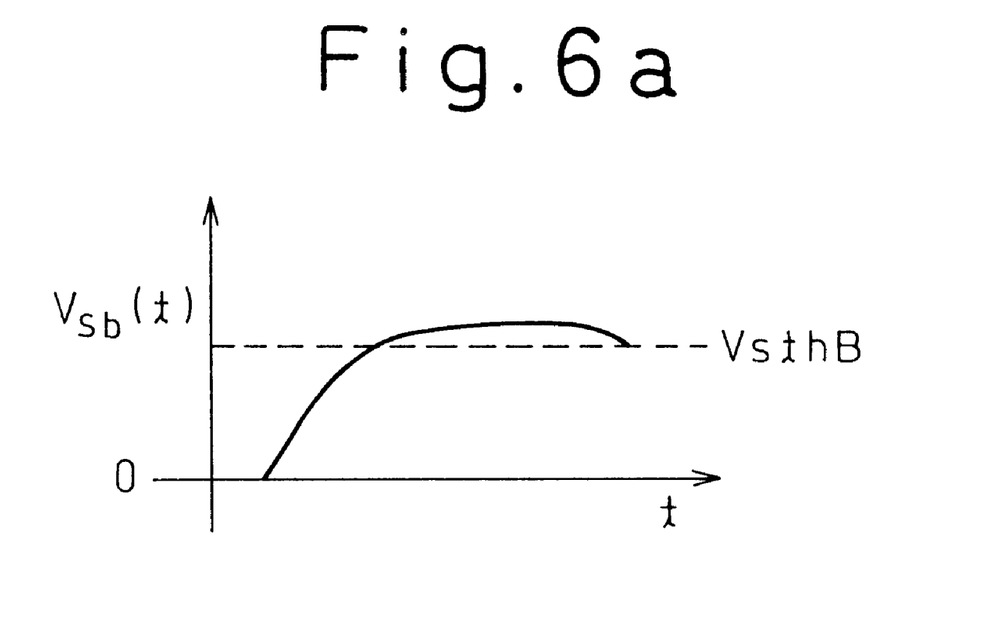
FIG. 6(a) shows an integral VSb(t) based on FIG. 3(b)
Figure 6B:
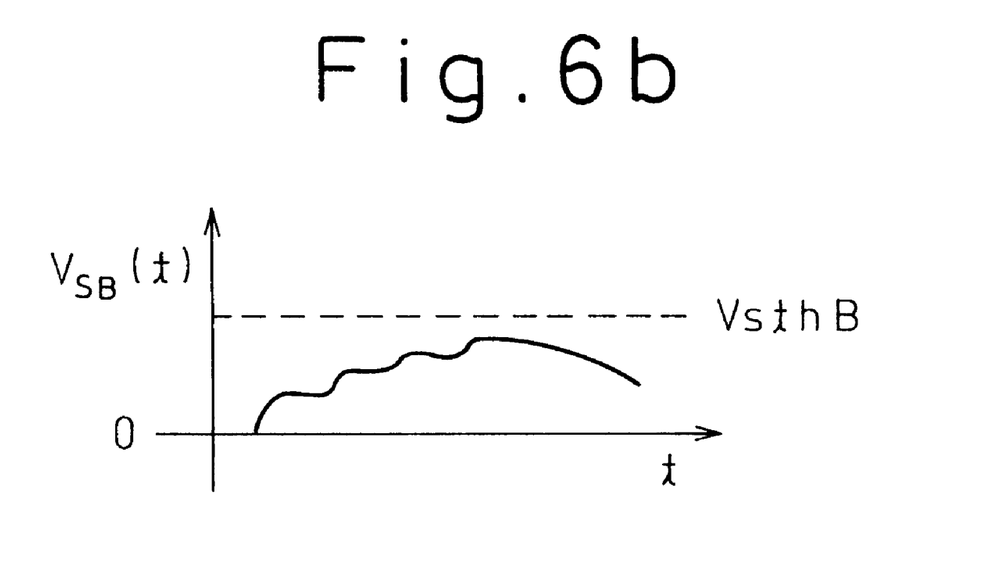
FIG. 6(b) shows an integral VSB(t) based on FIG. 4(b)
Figure 7A:
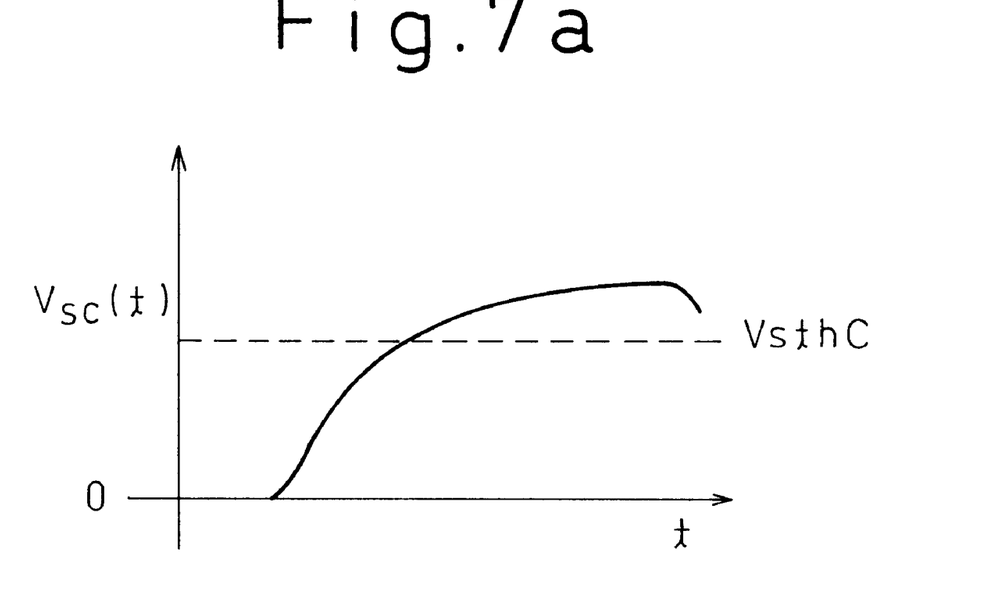
FIG. 7(a) shows an integral VSc(t) based on FIG. 3(c)
Figure 7B:
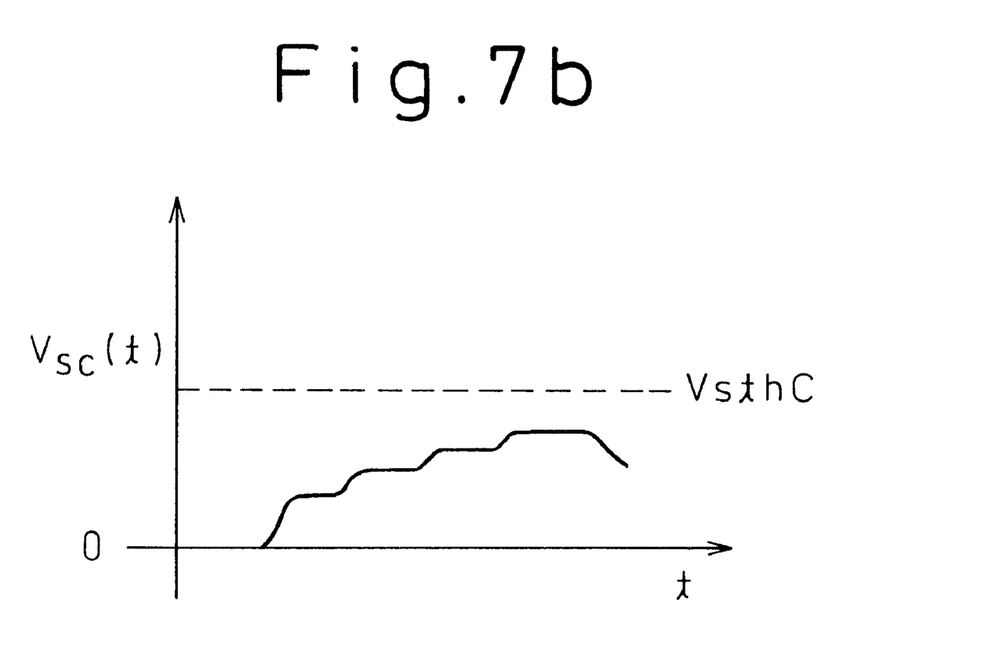
FIG. 7(b) shows an integral VSC(t) based on FIG. 4(c)
Figure 8A:
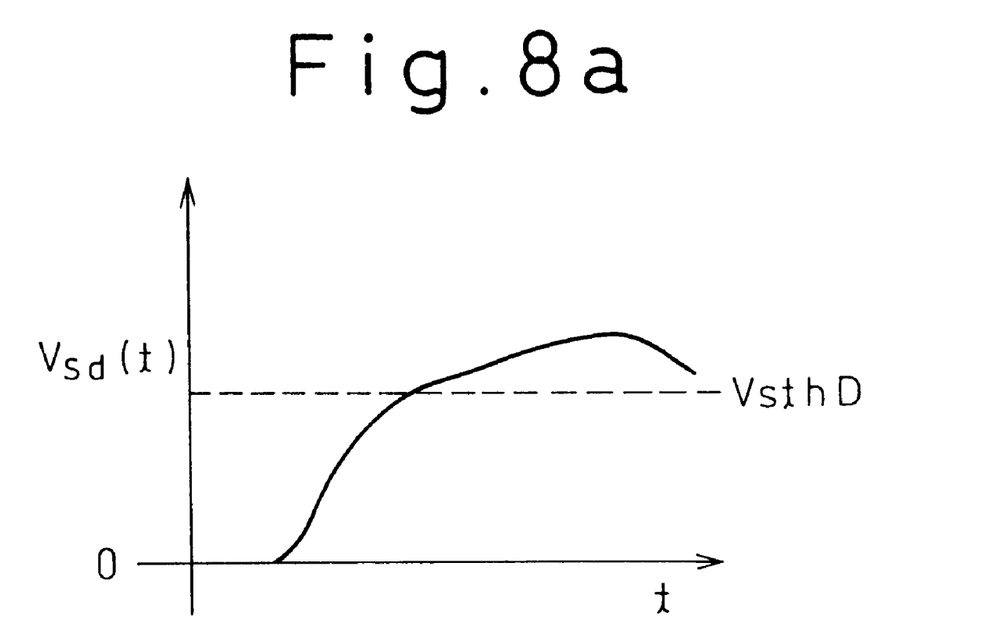
FIG. 8(a) shows an integral VSd(t) based on FIG. 3(d)
Figure 8B:
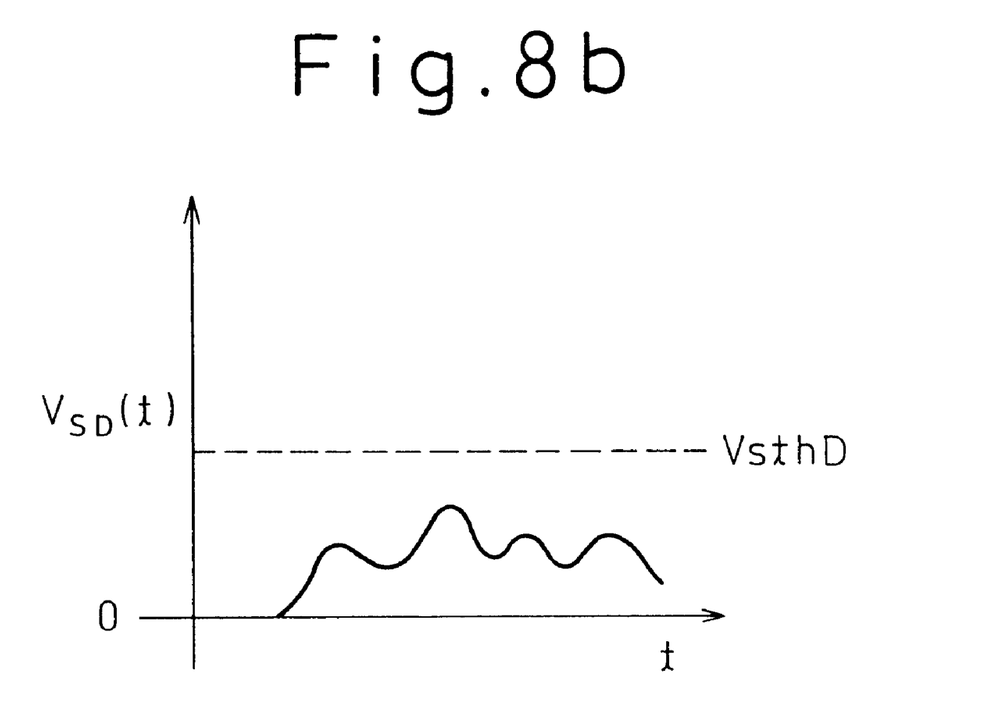
FIG. 8(b) shows an integral VSD(t) based on FIG. 4(d)

The rough-road integral VNA(t) is higher in frequency than the collision integral VNa(t), and therefore, the integrals VSB(t) and VSC(t) of FIGS. 6(b) and 7(b) are smaller than the integrals VSb(t) and VSc(t) of FIGS. 6(a) and 7(a). Accordingly, a threshold VSthB is set as VSB(t) <VSthB<VSb(t), and a threshold VSthC is set as VSC(t) <VSthC<VSc(t), to avoid an erroneous collision determination when the car is driving along a rough road.

The second threshold VR is set so that it is not exceeded as long as the car is driven normally. Namely, the integral VS(t) from the signal integrator 3 is zero and never exceeds the threshold VSth as long as the car is driven normally. In this case, the determination unit 4 never detects a collision erroneously.

When the integral VN(t) to be integrated by the signal integrator 3 is positive and below the second threshold VR, the integral indicates weak deceleration. In this case, the integral VS(t) provided by the signal integrator 3 is attenuated according to a given time constant. This will be explained later in detail.

This technique zeroes the integration VS(t) as soon as rough road driving ends, to avoid an erroneous collision determination even if rough road driving resumes or even if the OFF collision occurs after rough road driving.

If VS(t)<0, then VS(t) is zeroed, to prevent a delay in deploying the air bag when the ON collision occurs during rough road driving that may produce a negative integral.

Figure 9:
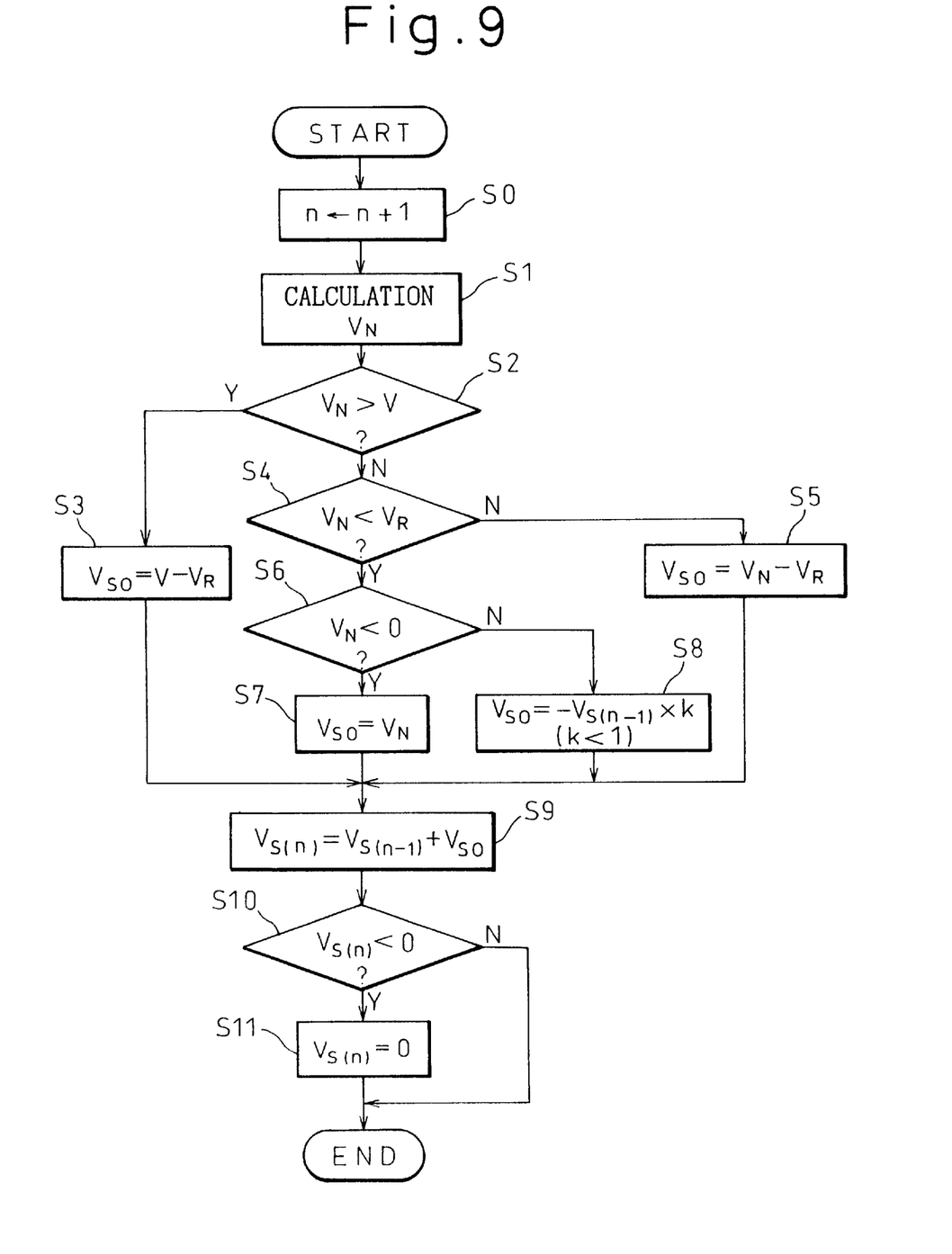
FIG. 9 is a flowchart showing the operation of a signal integrator 3 for integrating a signal in the area of FIG. 4(d)

FIG. 9 is a flowchart showing the operation of the signal integrator 3 that integrates a given signal in the area shown in FIG. 4(d). The operation takes place as an interrupt at intervals of 0.5 ms. Each interrupt accumulates an integral VSO of an integral VN provided by the interval integrator 2 and provides a cumulative integral VS(n), where "n" is the number of accumulations.

Step S0 increments the number n by one. Step S1 integrates the output of the acceleration sensor 1 for a given interval and provides an integral VN.

Step S2 determines whether or not VN>V. If VN>V, step S3 calculates VSO=V-VR, and if not, step S4 determines whether or not VN<VR. If V>VN>VR, step S5 calculates VSO=VN-VR, and if VN<VR, step S6 determines whether or not VN<0. If VN<0, step S7 sets VSO=VN, and if 0<VN<VR, step S8 is carried out.

Step S8 calculates VSO=−VS(n−1)×k, where k is a time constant smaller than one. When an 8-bit analog-to-digital converter is employed, k may be 1/256. Since the sampling period is 0.5 ms, the time constant k is equal to 256×0.5=128 ms.

Step S9 adds the VSO obtained in step S3, S5, S7, or S8 to a preceding cumulative value VS(n−1). If the process passes through steps S8 and S9, a new cumulative value VS(n) is formed by subtracting VS(n−1)×1/256 from VS(n−1). Namely, steps S8 and S9 attenuate the cumulative value VS(n) if 0<VN<VR because VN is small and is irrelevant to a collision. As a result, VS(n) will not remain after rough road driving, and even if rough road driving resumes, no erroneous collision determination will be made.

Step S10 determines whether or not VS(n)<0. If VS(n)<0, step S11 sets VS(n)=0, and if not, the process ends.

Although the embodiment lets the signal integrator 3 integrate the output of the interval integrator 2, this does not limit the present invention. The signal VG(t) from the acceleration sensor 1 is higher in frequency on a rough road than at a collision as shown in FIGS. 2(a) and 2(c). In addition, the rough road signal involves acceleration components (negative components) that are never seen in the collision signal. Accordingly, the signal integrator 3 may directly integrate the output VG(t) of the acceleration sensor 1, to realize the effect of the present invention.

Figure 10:
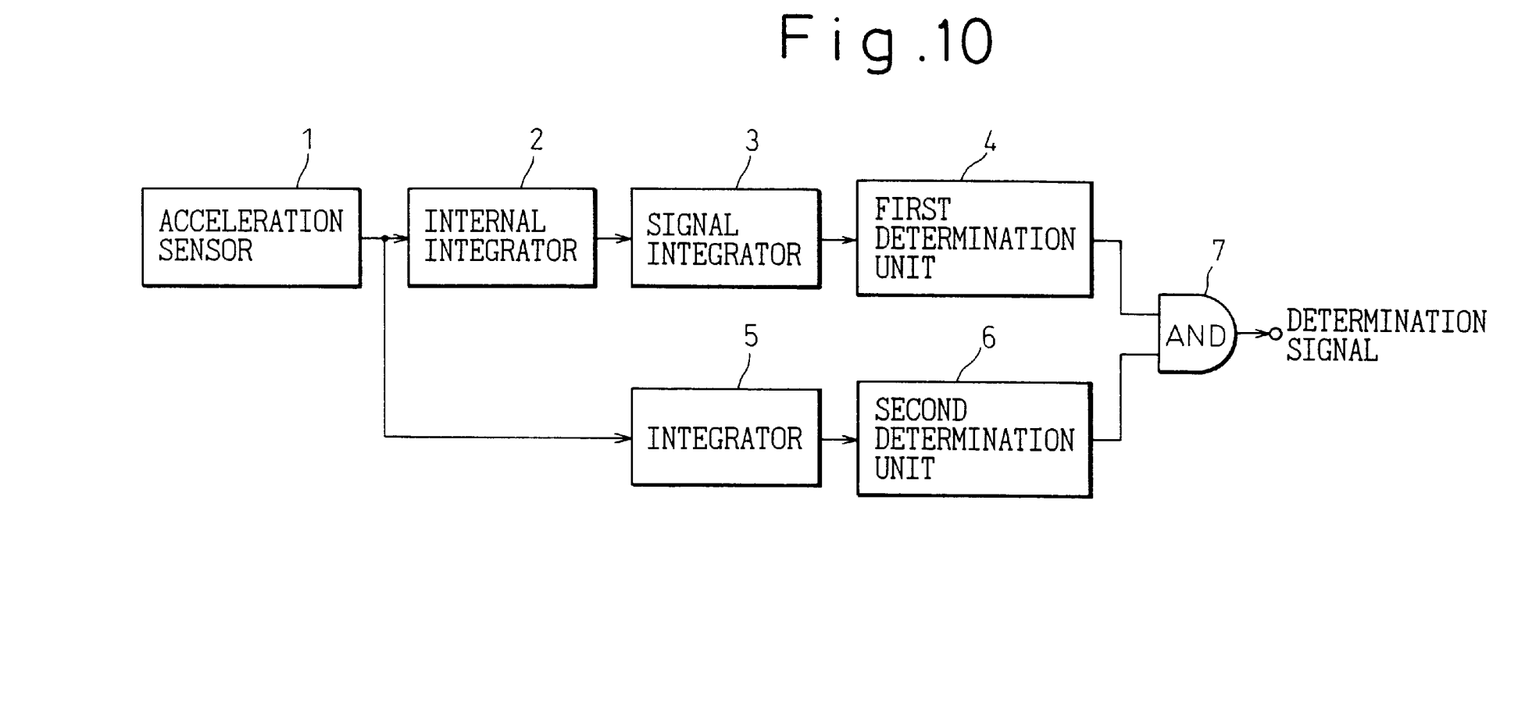
FIG. 10 shows an apparatus for determining a collision for an air bag according to another embodiment of the present invention.

FIG. 10 shows an apparatus for determining a collision for an air bag of a car according to another embodiment of the present invention. In addition to the structure of FIG. 1, the apparatus of FIG. 10 has an integrator 5 for integrating the output of an acceleration sensor 1, a second determination unit 6 to determine a collision if the output of the integrator 5 is above a threshold corresponding to the OFF collision, and an AND gate 7 for providing a collision signal only when the first and second determination units 4 and 6 both provide a collision determination.

The first determination unit 4 is identical to the determination unit 4 of FIG. 1, and therefore, will not be explained again.

The integrator 5 and second determination unit 6 are a conventional apparatus and are combined with the signal integrator 3 and first determination unit 4, to prevent an erroneous deployment of the air bag during rough road driving. The second determination unit 6 may have a low threshold without regard to rough road driving, to avoid a delay in determining an actual collision.

What is claimed is:

1. An apparatus for determining a collision for an air bag according to a signal from an acceleration sensor, comprising:
    a signal integrator for integrating an area, which is below a first amplitude threshold, of the signal from the acceleration sensor; and
    a determination unit for determining a collision if the output of the signal integrator is above a given value.

2. The apparatus of claim 1, wherein the signal from the acceleration sensor is integrated at given intervals.

3. The apparatus of claim 1, further comprising:
    a second determination unit for determining a collision according to the signal from the acceleration sensor; and
    an output unit for providing a collision signal if both the determination units determine a collision.

4. An apparatus for determining a collision for an air bag according to a signal from an acceleration sensor, comprising:
    a signal integrator for integrating an area, which is above a second amplitude threshold, of the signal from the acceleration sensor; and
    a determination unit for determining a collision if the output of the signal integrator is above a given value.

5. The apparatus of claim 4, wherein an integral of the signal from the acceleration sensor is attenuated according to a given time constant if the signal indicates deceleration and is below the second amplitude threshold.

6. The apparatus of claim 5, wherein the signal from the acceleration sensor is integrated at given intervals.

7. The apparatus of claim 4, wherein the second amplitude threshold is set so that it is not exceeded by the signal from the acceleration sensor as long as the car is driven normally.

8. The apparatus of claim 7, wherein the signal from the acceleration sensor is integrated at given intervals.

9. An apparatus for determining a collision for an air bag according to a signal from an acceleration sensor, comprising:
    a signal integrator for integrating an area, which is below a first amplitude threshold and above a second amplitude threshold, of the signal from the acceleration sensor; and
    a determination unit for determining a collision if the output of the signal integrator is above a given value.

10. An apparatus for determining a collision for an air bag according to a signal from an acceleration sensor, comprising:
    a signal integrator for integrating an area, area of the signal from the acceleration sensor which is below a first amplitude threshold and above a second amplitude threshold and for integrating an area of the signal from the acceleration sensor which corresponds to acceleration; and
    a determination unit for determining a collision if the output of the signal integrator is above a given value.

11. The apparatus of claim 10, wherein, if an integral of the signal from the acceleration sensor in the area below the first amplitude threshold and above the second amplitude threshold is smaller than an integral of the signal from the acceleration sensor in the area which corresponds to acceleration, the sum of the integrals is zeroed.

12. The apparatus of claim 11, wherein the signal from the acceleration sensor is integrated at given intervals.

* * * * *